March 5, 1957
J. L. PETTUS ET AL
2,784,260
SHUTTERLESS DIRECT POSITIVE SOUND RECORDING SYSTEM
Filed Dec. 22, 1954
2 Sheets-Sheet 1
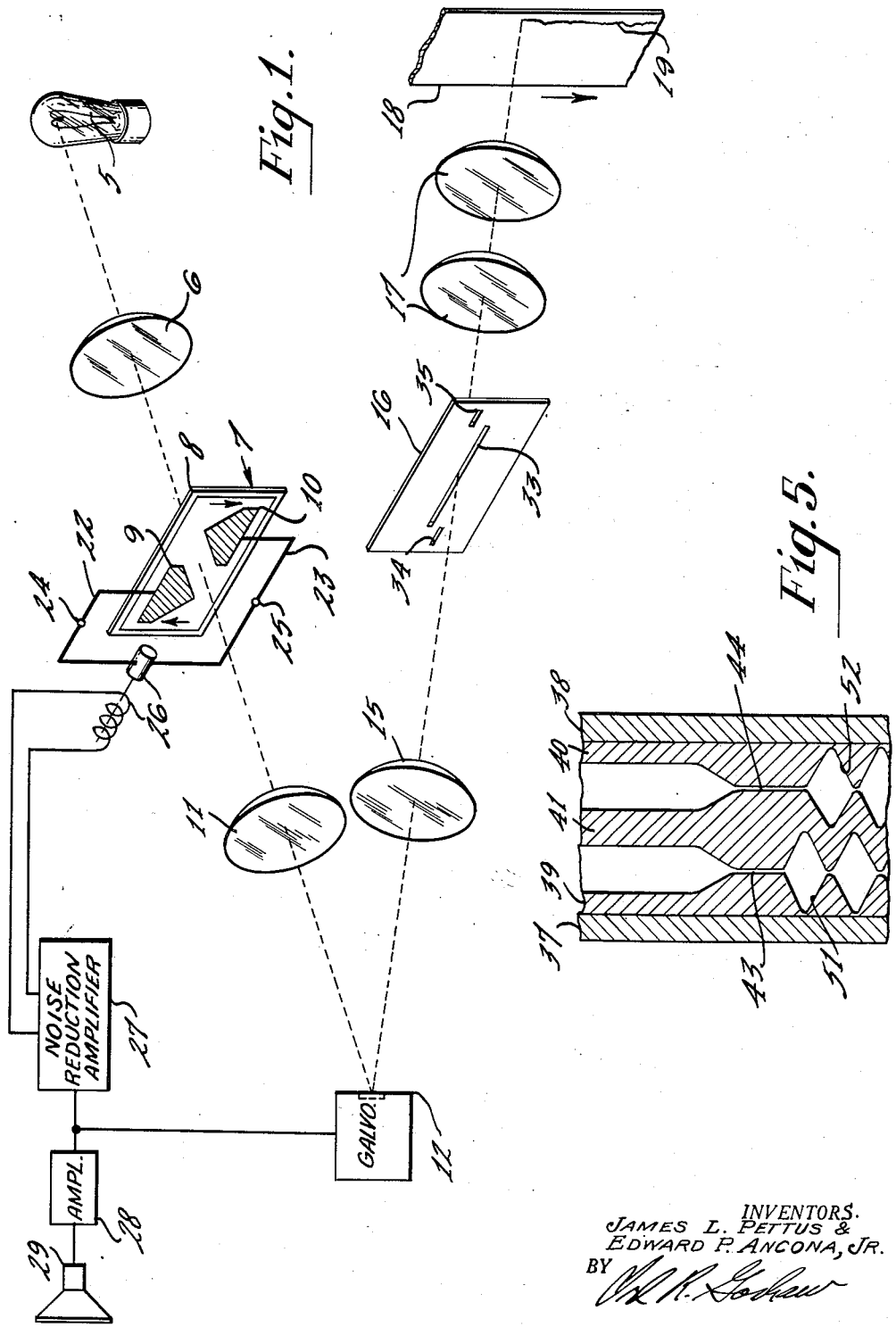
INVENTORS.
JAMES L. PETTUS &
EDWARD P. ANCONA, JR.
BY
ATTORNEY.

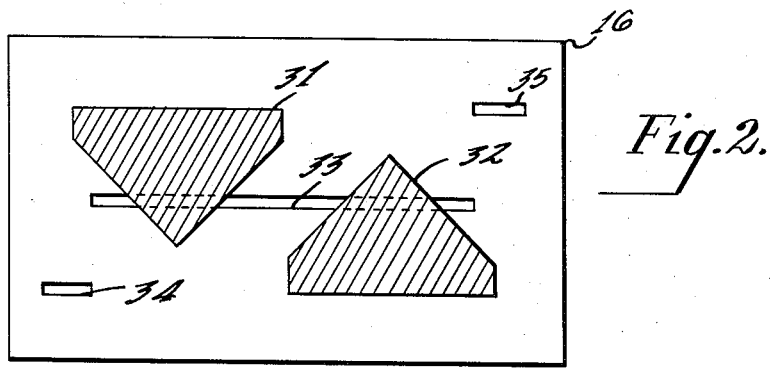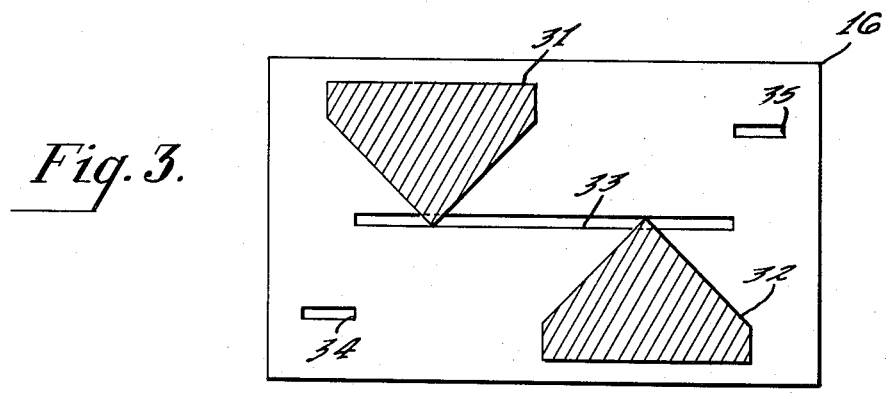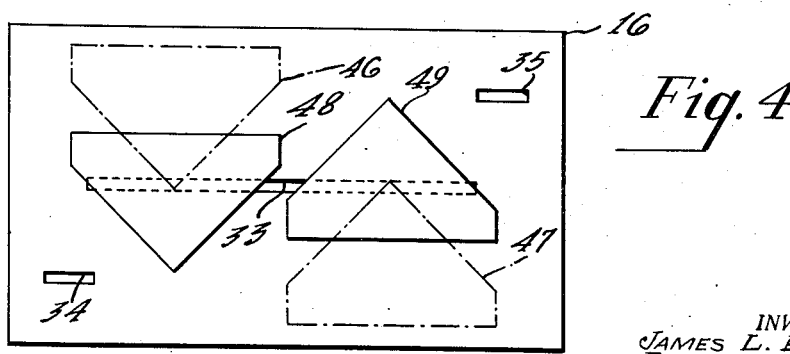

United States Patent Office 2,784,260
Patented Mar. 5, 1957

2,784,260

SHUTTERLESS DIRECT POSITIVE SOUND RECORDING SYSTEM

James L. Pettus, Encino, Calif., and Edward P. Ancona, Jr., Larchmont, N. Y., assignors to Radio Corporation of America, a corporation of Delaware Application December 22, 1954, Serial No. 477,074

7 Claims. (Cl. 179—100.3)

This invention relates to sound recording, and particularly to an optical or photographic type of sound recording system which is capable, by a minimum change, of producing a variable area duplex bilateral wide class "A" push-pull direct positive form of photographic sound record or a variable area bilateral standard width direct positive form of photographic sound record.

Wide optical or photographic sound records of the variable area 200 mil width type have been used for making original sound recordings to obtain a large signal-to-noise ratio. These systems have required a shutter which is actuated by the output of a noise reduction amplifier, which corresponds to the average value of the signal being recorded, to vary the application of noise reduction to a variable area type sound record in accordance with the amplitude of the signal. By using one half of a 200 mil width system, a standard width direct positive photographic record may be obtained. Any direct positive record may, of course, be used directly after normal processing.

As mentioned above, former types of push-pull class "A" variable area recording direct positive systems used a shutter, or shutters, positioned adjacent the slit mask for controlling the light to the film to provide noise reduction. A system of this type is described in co-pending application, Serial No. 477,073, filed December 22, 1954, assigned to the same assignee. This system also uses an aperture plate which forms the light into a tapered beam or beams. The present invention eliminates the shutter and incorporates in the light beam shape forming plate the noise reduction feature. Since a class "A" push-pull direct positive record requires the "painting" with light, the light image impressed on the slit is determined by the position of tapered opaque light eliminating elements of the aperture plate. These can be actuated by the noise reduction currents in opposite directions to provide the desired noise reduction action. By using only one shutter, a standard width bilateral direct positive record may be produced.

The principal object of the invention, therefore, is to facilitate the recording of optical or photographic sound records of the duplex bilateral variable area class "A" push-pull direct positive type or standard width photographic records of the direct positive type.

Another object of the invention is to provide an improved optical sound recording system with which records of the variable area push-pull direct positive type or standard width optical direct positive records may be made.

A further object of the invention is to provide a variable area class "A" push-pull direct positive recording system which provides noise reduction therein by actuation of the elements of the aperture plate to eliminate the use of shutters.

The novel features which are believed to be characteristic of this invention, both as to the manner of its organization and the mode of its operation, will be better understood from the following description when read in conjunction with the accompanying drawings, in which:

Fig. 1 is a diagrammatic view of a sound recording system embodying the invention;

Fig. 2 is a view of the light image and slit plate combination of the system shown in Fig. 1;

Fig. 3 is another view of the light image and slit plate combination of the system shown in Fig. 1;

Fig. 4 is a third view of the light image and slit plate combination for explaining the operation of the system shown in Fig. 1; and Fig. 5 is a view of a partial film record showing a type of record obtainable with the system in Fig. 1.

The system shown in Fig. 1 includes a light source lamp 5, condensing and projecting lens 6, an aperture forming plate unit 7, having a frame 8, and a pair of opaque light shaping elements 9 and 10, and a lens element 11, which projects light on a movable mirror of a galvanometer 12. Light reflected from the mirror is projected by lens 15 to a slit plate 16, the emerging light from which is projected by a lens unit 17 to a film 18 for forming a sound track 19, the film moving in the direction shown by the arrow.

The elements 9 and 10 are mounted on rods 22 and 23, shown diagrammatically as pivoted at 24 and 25, respectively, so that actuation of a solenoid unit 26 in one direction will separate the elements 9 and 10, as shown by the arrows, and actuation of the solenoid in the other direction will move the elements 9 and 10 closer together along parallel paths. The solenoid unit 26 is connected to a noise reduction amplifier 27, which in turn is connected to an amplifier 28 fed from a microphone 29 or other suitable signal source. The amplifier 28 also feeds the modulating winding of the galvanometer 12.

The system in Fig. 1 can produce a variable area duplex bilateral class "A" push-pull direct positive record, such as shown in Fig. 5. To explain the operation of the system, reference is made to Figs. 2, 3, and 4.

In Figs. 2, 3, and 4, the slits of plate 16 are shown at 33, 34, and 35 with light impressed thereon, the light being eliminated by the opaque elements 9 and 10, as shown by the shadows 31 and 32. The slits 34 and 35 create marginal areas 37 and 38 of the sound record shown in Fig. 5. There is actually no line of separation between areas 37 and 38 and areas 39 and 40, except that in the event the slits 34 and 35 have a greater width, the areas 37 and 38 may be of a higher density than the sections 39 and 40. However, for the purpose of explanation, the areas are shown separated by the lines in Fig. 5.

The upper portion of the section of the record shown in Fig. 5 is provided when the elements 9 and 10 are in a position to form the shadows 31 and 32 on the slits as shown in Fig. 2. Thus, as mentioned above, areas 37 and 38 are formed by the light passing through slits 34 and 35, the areas 39 and 40 are formed by the light passing through the ends of the slit 33, and the area 41 is formed by the light passing through the central portion of the slit. This is the condition of zero modulation and no noise reduction. The system is adjusted, however, so that for zero modulation, or times of no signal, and 100% noise reduction, only two narrow bias lines 43 and 44 are formed. This is caused by adjusting the solenoid unit 26 with respect to the output of unit 27, so that the elements 9 and 10 are separated and only the tips thereof cross the slit 33. Thus, light will again pass through slits 34 and 35, while longer lengths of light will pass through the central portion of the slit 33 and the end portions of the slit. This condition is shown in Fig. 3.

Now, referring to Fig. 4, the condition of zero modulation of the elements 9 and 10 and 100% noise reduction is shown by the broken line shadows 46 and 47, while 100% modulation and no noise reduction is shown by the solid line shadows 48 and 49, which is the other extreme position of the elements 9 and 10. In the positions 48 and 49, light is prevented from passing through the slit 33 except for the slight horizontal separation between shadows, while light will still pass through slits 34 and 35. Thus, as the signal amplitudes increase from zero, as shown by the bias lines 43 and 44 in Fig. 5, to 100% modulation, as shown by the modulations 51 and 52, the elements 9 and 10 will be adjusted away and toward each other along parallel paths in accordance with the average value of the signal currents so that the final record when normally processed will appear as shown in Fig. 5. The record, of course, never appears as shown in the upper section of Fig. 5 but only as shown by the bias lines or with different amplitude modulations, 100% modulation being shown at 51 and 52. The record shown in Fig. 5 may be considered a 200 mil width record especially desirable for original recordings where a high signal-to-noise ratio is desired for rerecording for release negatives.

For the production of a standard width direct positive bilateral record, it is only necessary to cover by an opaque shield one half of the aperture plate 7. A standard width or 100 mil width photographic record will result. It is understood that although the elements 9 and 10 are shown as V's, the elements could also be in the shape of W's, or elements with any number of tapered points. Thus, the system above described will produce a wide, duplex bilateral, class "A" push-pull direct positive record or a one half or standard width record of the bilateral direct positive type. Thus, without a shutter and only using an aperture plate and slit plate, the above mentioned types of optical sound records may be recorded.

A negative bilateral record may be produced by an aperture plate passing a chevron type light beam and biasing the galvanometer as disclosed and claimed in Dimmick U. S. Patent No. 2,468,047 of April 26, 1949.

We claim:

1. A sound recording system for recording on a film movable along a set path, said system comprising a light source, a galvanometer, a light beam forming unit between the light source and said galvanometer, a slit plate between said galvanometer and said path, means interposed between said light source, said light beam forming unit, said galvanometer, said slit plate and said film path for projecting light from said light source to said film, said light beam forming unit including a frame having an aperture therein and opaque elements positioned in said aperture, each element having a tapered side, and means for moving said opaque elements simultaneously in opposite directions in an amount depending upon the amplitude of a signal being recorded, the direction of movement of said opaque elements being in the direction of movement of film in said path at the point of impression of light thereon.

2. A sound recording system in accordance with claim 1, in which the slit plate has a single modulating slit therein, said last mentioned means varying the lengths of the shadows of said opaque elements on said slit in accordance with the average value of the signal being recorded.

3. A sound recording system in accordance with claim 1, in which are provided means for impressing signal currents to be recorded on said galvanometer, and means for impressing currents corresponding to the average value of said signal currents on said last mentioned means.

4. A direct positive optical sound recording system comprising a light source, means for forming light from said source into a broad beam of light, means for forming said broad beam of light into a plurality of narrower beams of light, means for forming said narrower beams of light into a plurality of lines of light, means for varying the lengths of certain of said lines of light in accordance with the instantaneous values of a signal to be recorded, and means for varying the lengths of certain of said lines of light in accordance with the average value of said signal, said last mentioned means including movable opaque elements having tapered sides, said opaque elements being movable in a direction perpendicular to the length of said lines of light, said elements being included in said broad beam forming means.

5. A direct positive optical sound recording system comprising a light source, means for forming light from said source into a broad beam of light, means for forming said broad beam of light into a plurality of narrower beams of light, means for forming said narrower beams of light into a plurality of lines of light, means for varying the lengths of certain of said lines of light in accordance with the instantaneous values of a signal to be recorded, and means for varying the lengths of certain of said lines of light in accordance with the average value of said signal, said fourth mentioned means including a galvanometer for vibrating said narrower beams of light in a certain direction on said third mentioned means, and said last mentioned means includes tapered opaque elements for forming shadows on said third mentioned means, said opaque elements being movable in the same direction in which said narrower beams of light are vibrated, said shadows being vibrated by said galvanometer.

6. A direct positive photographic sound recording system for recording on a film along a set path, said system comprising a light source, means for projecting a plurality of narrow light beams of varying lengths to said path of said film, said means including means for shaping light from said source into a substantially rectangular beam and having tapered light intercepting elements adapted to move in said light beam in accordance with the average value of signals to be recorded and in the direction of the movement of the film in said path, means for limiting said rectangular beam to a plurality of narrow beams, and means for vibrating said rectangular beam and the shadows of said light intercepting elements on said light beam limiting means in accordance with the instantaneous values of said signals.

7. A direct positive photographic sound recording system in accordance with claim 6, in which said last mentioned means is a galvanometer, and noise reduction means is provided for moving said light intercepting elements.

References Cited in the file of this patent
UNITED STATES PATENTS

| | | |
|---|---|---|
| 2,235,513 | Blaney | Mar. 18, 1941 |
| 2,311,159 | Dimmick | Feb. 16, 1943 |
| 2,404,137 | Maurer | July 16, 1946 |